United States Patent
Tanaka et al.

(10) Patent No.: US 7,093,629 B2
(45) Date of Patent: Aug. 22, 2006

(54) PNEUMATIC TIRE AND METHOD OF MANUFACTURING RUBBER COMPONENT THEREFOR

(75) Inventors: Yoshikazu Tanaka, Kobe (JP); Genichiro Ishikawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/947,751

(22) Filed: Sep. 7, 2001

(65) Prior Publication Data

US 2002/0056496 A1  May 16, 2002

(30) Foreign Application Priority Data

Sep. 7, 2000 (JP) .............................. 2000-271898

(51) Int. Cl.
*B29D 30/60* (2006.01)
*B29D 30/72* (2006.01)

(52) U.S. Cl. .................. 152/209.1; 152/524; 156/117; 156/130

(58) Field of Classification Search .............. 156/117, 156/96, 130, 130.7, 397; 152/524, 525, 209.5
See application file for complete search history.

(56) References Cited

U.S. PATENT DOCUMENTS 3,177,918 A * 4/1965 Holman ..................... 156/117
3,268,380 A * 8/1966 Guichon et al. ............ 156/130
3,308,000 A * 3/1967 Holman ..................... 156/130
6,016,857 A * 1/2000 Roesgen et al. .......... 152/209.1
6,039,826 A * 3/2000 Okada ........................ 156/117
6,328,084 B1 * 12/2001 Caretta et al. .............. 152/541

FOREIGN PATENT DOCUMENTS

| EP | 1 020 284 A2 | 7/2000 |
|---|---|---|
| EP | 1020284 | 7/2000 |
| EP | 1 033 218 A2 | 9/2000 |
| GB | 910 715 | 11/1962 |
| JP | 7-251466 | 10/1995 |
| JP | 2000-094542 | 4/2000 |

\* cited by examiner

*Primary Examiner*—Geoffrey L. Knable
(74) *Attorney, Agent, or Firm*—Birch, Stewart, Kolasch & Birch, LLP

(57) ABSTRACT

A method of manufacturing a rubber component for a pneumatic tire which comprises a process of overlap-winding at least one rubber tape into a target cross sectional shape for the rubber component, wherein each rubber tape has a thickness of from 0.3 to 3.0 mm and a width of from 5 to 40 mm, and an inner surface and/or an outer surface of the rubber component are defined by a surface layer made of windings of the rubber tape which windings are overlapped by a width WJ less than 75% of the rubber tape width but more than 1.0 mm.

8 Claims, 8 Drawing Sheets

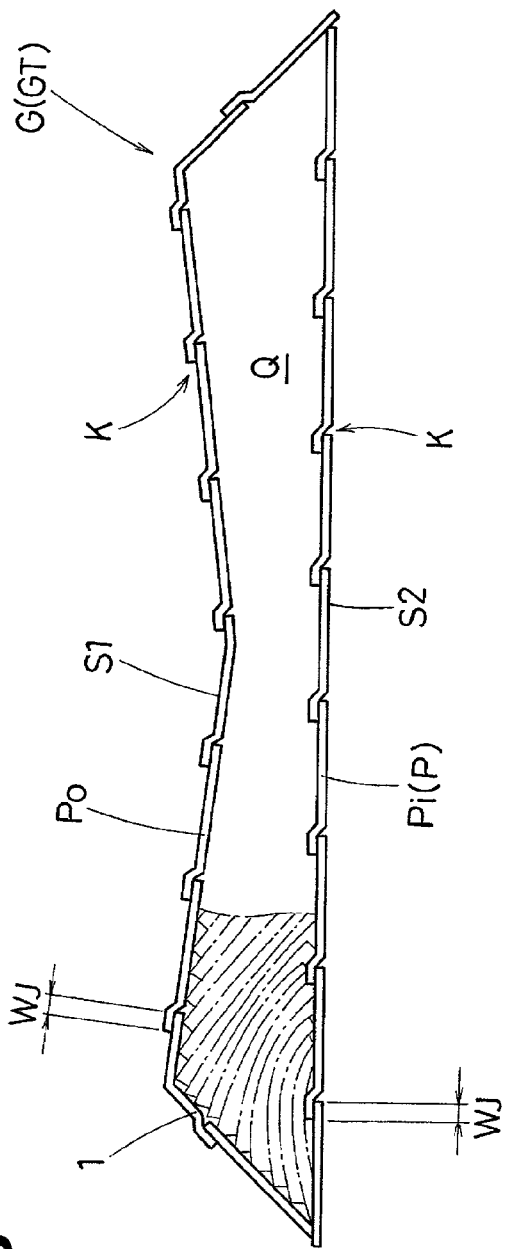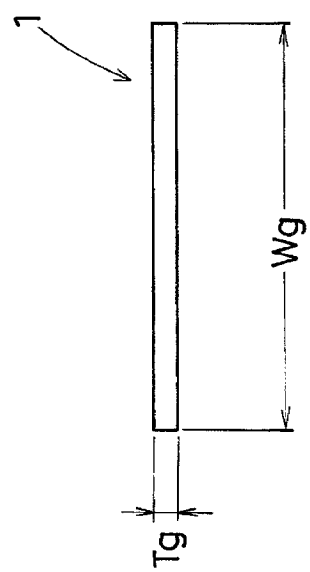

PNEUMATIC TIRE AND METHOD OF MANUFACTURING RUBBER COMPONENT THEREFOR

The present invention relates to a pneumatic tire made from a rubber component formed by overlap winding a rubber tape, and a method of manufacturing the rubber component.

In general, a pneumatic tire is made from various rubber components, e.g. tread rubber, sidewall rubber, inner liner and the like having different shapes and different characteristics. Conventionally, such rubber components are made by means of extruders and fed to building drums to be applied thereon. Therefore, it is necessary to prepare various extruding dies, and the extrusion head has to adapt its size to the largest die. Thus, it is difficult to decrease not only the machine size but also the plant size.

In recent years, on the other hand, a flexible manufacturing system is required by tire manufacturers.

Under the circumstances there has been proposed a method of making rubber components in which as shown in FIG. 9, a rubber component (shown is a tread rubber g) is formed directly on a drum by overlap winding a tape (a) of unvulcanized rubber into a shape close to the target sectional shape Y. The rubber tape (a) has a thickness of 3 to 6 mm and a width of 40 to 150 mm and it is wound from one end to the other end. In this technique, due to the edges (ae) of the windings of the rubber tape (a), the rubber component (g) has a jagged face (S1, S2). As a result, in the boundary between the rubber component (g) and the adjacent layer, small dents (k) are liable to remain as a small air-filled cavity. In case of a tread rubber and adjacent tread reinforcing belt for example, there is a possibility of a separation being caused by such cavities. On the other hand, when the jagged face is exposed in the tread portion, sidewall portion and the like, the small dent (k) is liable to remain as a very fine open dent or a small air bubble covered by thin rubber. In this case also there is a possibility of cracks. Further, a mold release agent, lubricant and the like, which are sprayed on the surface, is liable to remain in surplus in the dents (k) and penetrate between the windings. Thus, separation is liable to occur. These are not desirable for the tire durability.

It is therefore, an object of the present invention to provide a method of manufacturing a rubber tire component which can get rid of the above-mentioned drawbacks.

Another object of the present invention is to provide a pneumatic tire improved in durability by preventing the above-mentioned separation and cracks.

According to one aspect of the present invention, a method of manufacturing a rubber component for a pneumatic tire, comprises overlap winding at least one rubber tape into a target cross sectional shape for the rubber component, wherein each rubber tape has a thickness of from 0.3 to 3.0 mm and a width of from 5 to 40 mm, and an inner surface and/or an outer surface of the rubber component are defined by a surface layer made of windings of said at least one rubber tape which windings are overlapped by a width WJ less than 75% of the rubber tape width but more than 1.0 mm.

Embodiments of the present invention will now be described in detail in conjunction with the accompanying drawings.

FIG. 1 is a cross sectional view of a rubber component made according to the present invention.

FIG. 2 is an enlarged cross sectional view of a rubber tape.

As well known in the art, a pneumatic tire usually comprises a tread portion, a pair of axially spaced bead portions each with a bead core therein, a pair of sidewall portions, a carcass extending between the bead portions, a tread reinforcing belt disposed radially outside the carcass in the tread portion, a tread rubber GT disposed radially outside the carcass in the tread portion defining the tread face, a sidewall rubber GS disposed axially outside the carcass in each sidewall portion, a bead apex rubber disposed on the radially outside of the bead core, a clinch rubber disposed along the outer surface of each bead portion, a gas-impermeable inner liner rubber GI disposed along the inner surface of the tire, and the like.

According to the present invention, rubber components G such as tread rubber GT, sidewall rubber GS, bead rubber (clinch rubber, bead apex rubber, etc.), inner liner rubber GI and the like for a pneumatic tire is formed by overlap winding a raw rubber tape 1 into a target cross sectional shape for the rubber component.

The rubber tape 1 is wound so that a surface layer P is formed along at least a part of the surface of the rubber component G, for example the outer surface, inner surface S2 and the like, especially a part coming into touch with nonelastomeric material or being exposed to the air.

The surface layer P is made up of windings of at last one rubber tape 1 which windings are arranged with small overlaps WJ in a range of more than 1.0 mm width but less than 75%, preferably less than 50% of the tape width Wg. And in the surface layer P, the thickness Tg of the rubber tape 1 is in a rage of from 0.3 to 3.0 mm and the width Wg thereof is in a rage of from 5 to 40 mm as shown in FIG. 2, namely, a relatively thin rubber tape is used in the surface layer P at least. For example, if the overlap WJ is 25% of the tape width Wg, the remaining width of about 75% of the tape width Wg forms a part of the surface of the rubber component G devoid of the above-mentioned small dent (k). The rubber tape 1 is so wound.

FIRST EXAMPLE (Tread Rubber)

FIG. 1 shows a first example of the rubber tire component G which is a raw tread rubber GT.

The tread rubber GT comprises internal windings Q in addition to the windings forming the surface layer P, and the surface layer P fully covers the internal windings Q. Thus, the surface layer P in this example includes an outside surface layer Po whose outer surface S1 forms the tread face, and an inside surface layer Pi whose inner surface S2 forms face contacting with a tread reinforcing belt.

The tread rubber GT may be formed directly on the outside of a tread reinforcing belt formed or applied on a drum in advance.

Figure 3A:
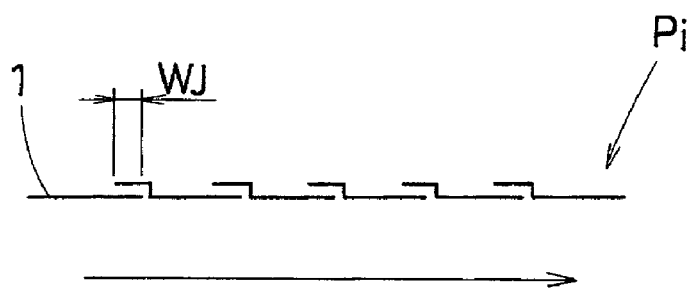
FIGS. 3a, 3b, 3c and 3d are diagrams showing various examples of the winding method for the inside surface layer.
Figure 3B:
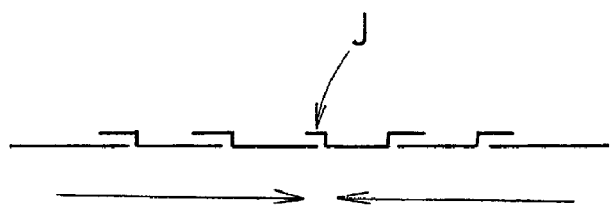
Figure 3C:
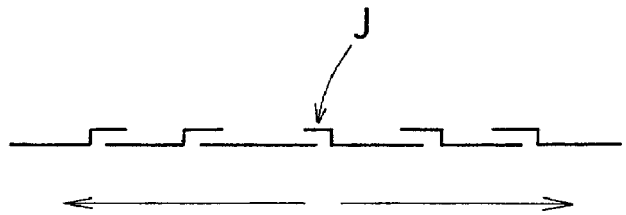
Figure 3D:
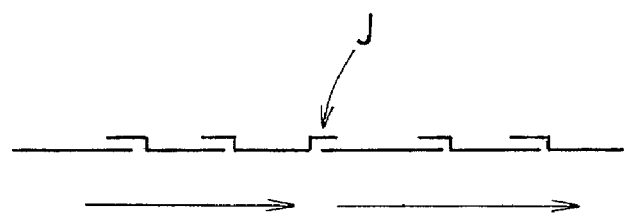

FIGS. 3a–3d show methods of making the inside surface layer Pi. The inside surface layer Pi may be made by winding (a) a rubber tape continuously from one end to the other end as shown in FIG. 3a;

(b) a rubber tape from one end to the center and another rubber tape from the other end to the center as shown in FIG. 3b;

(c) a rubber tape from the center to one end and another rubber tape from the center to the other end as shown in FIG. 3c; or (d) a rubber tape from one end to the center and another rubber tape from the center to the other end as shown in FIG. 3d. The arrows indicate the winding directions. The two tapes are wound at the same time to reduce the winding time.

Figure 4A:
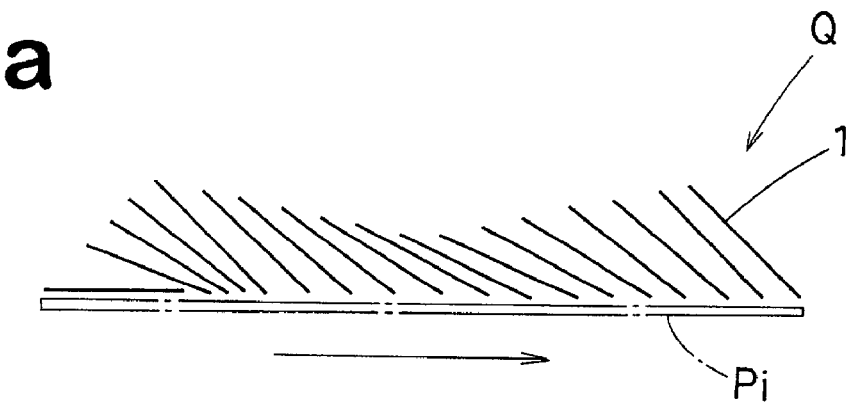
FIGS. 4a, 4b and 4c are diagrams showing various examples of the winding method for the internal windings.
Figure 4B:
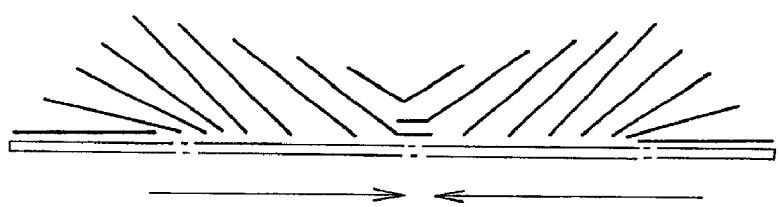
Figure 4C:
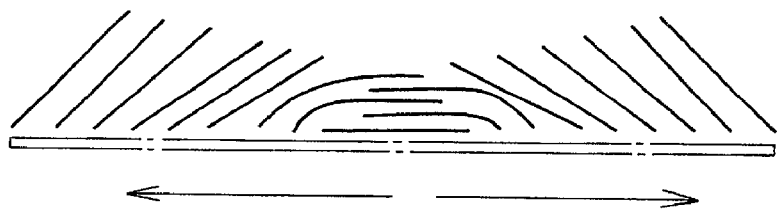

The above-mentioned internal windings Q are formed on the inside surface layer Pi. FIGS. 4a–4c show methods of making the internal windings Q. In FIG. 4a, one rubber tape is wound continuously from one end to the other end. In FIG. 4b, one rubber tape is wound from one end to the center and the other rubber tape is wound from the other end to the center. In FIG. 4c, one rubber tape is wound from the center to one end and the other rubber tape is wound from the center to the other end. Further, it is also possible that one rubber tape is wound from one end to the center and the other rubber tape is wound from the center to the other end. The rubber tapes used here may be the same tapes used in making the inside surface layer Pi. But, it is also possible to use a different rubber tape or thicker tape. In case of the same tape, the tape can be wound continuously from the inside surface layer Pi.

Figure 5A:
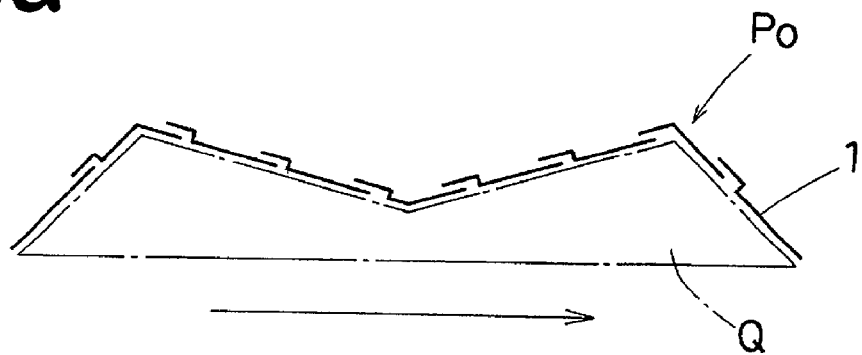
FIGS. 5a, 5b and 5c are diagrams showing various examples of the winding method for the outside surface layer.
Figure 5B:
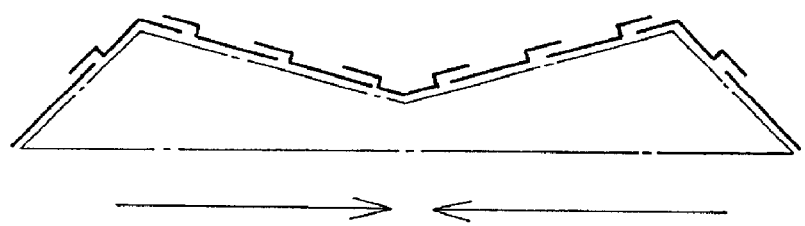
Figure 5C:
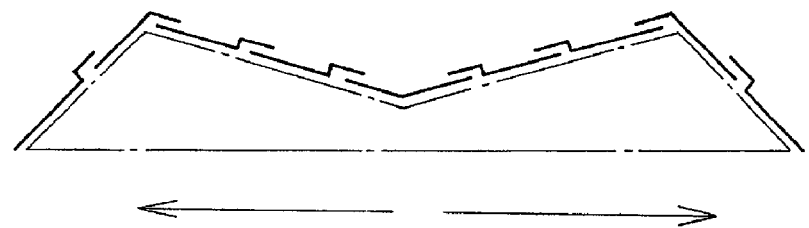

On the internal windings Q, the above-mentioned outside surface layer Po is formed. FIGS. 5a–5c show methods of making the outside surface layer Po. In FIG. 5a, one rubber tape is wound continuously from one end to the other end. In FIG. 5b, one rubber tape is wound from one end to the center and the other rubber tape is wound from the other end to the center. In FIG. 5c, one rubber tape is wound from the center to one end and the other rubber tape is wound from the center to the other end. Further, it is also possible that one rubber tape is wound from one end to the center and the other rubber tape is wound from the center to the other end. If a thicker rubber tape is used for the internal windings Q, the rubber tape is again changed to a thin tape as used in the inside surface layer Pi. If the same tape is used from the inside surface layer Pi through the internal windings Q, the tape may be wound continuously.

As the tread rubber is relatively thick, most of the internal windings Q rise up so that the thickness of the rubber component G is provided by the width of the tape.

In case the tape width is short, an auxiliary layer R may be formed on the inside surface layer Pi. Such auxiliary layer R may be also utilized to make the shape of the windings close to the target shape of the rubber component.

Figure 6A:
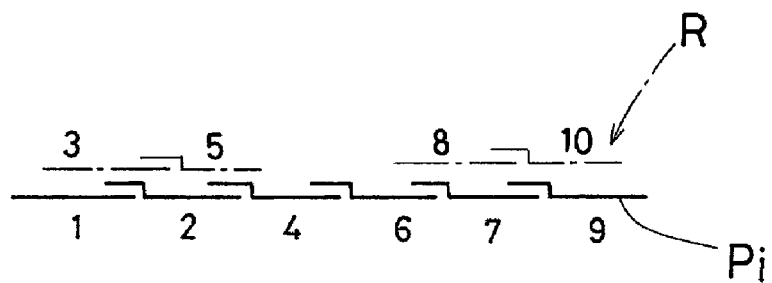
FIGS. 6a, 6b and 6c are diagrams showing various examples of the winding method for the inside surface layer and an auxiliary layer.
Figure 6B:
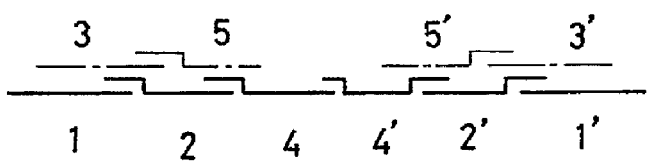
Figure 6C:
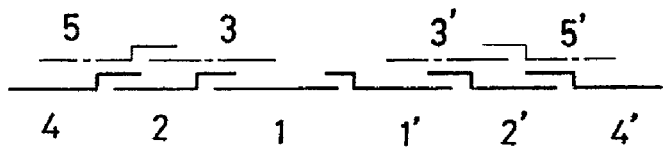

It is not always necessary to form the auxiliary layer R after the inside surface layer Pi is formed. It is possible to form the auxiliary layer R and inside surface layer Pi at the same time as shown in FIG. 6a, 6b and 6c, wherein the numbers indicate the order of windings.

SECOND EXAMPLE (Sidewall Rubber)

Figure 7:
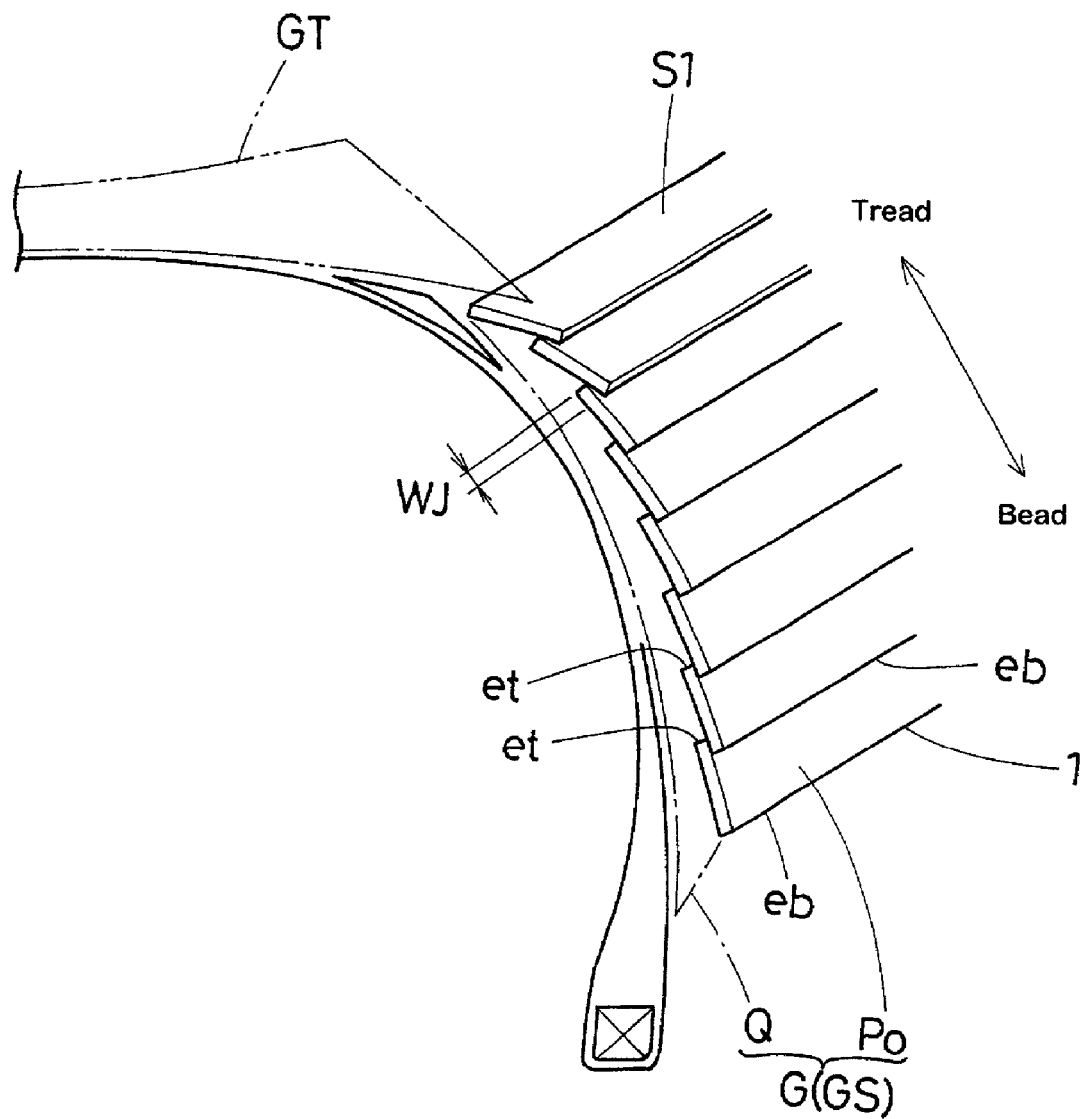
FIG. 7 is a schematic perspective view for explaining another example of the rubber component.

FIG. 7 shows a second example of the rubber tire component G which is a raw sidewall rubber GS.

The sidewall rubber GS comprises internal windings Q in addition to the windings forming the surface layer P. The sidewall rubber GS is relatively thin when compared with the above-mentioned tread rubber, and it is not necessary to rise up the internal windings Q so much and it is possible to decrease overlap widths. Therefore, the inside surface layer Pi is omitted. The surface layer P is made up of only an outside surface layer Po whose outer surface S1 forms the outer surface of the sidewall. The inside of the internal windings Q abuts on the carcass.

In the surface layer P of the sidewall rubber GS, it is preferable that the thickness Tg of the rubber tape 1 is in a range of from 0.3 to 2.0 mm and the overlap width WJ is lass than 0.5 times the tape width Wg but more than 1.0 mm for the prevention of crack damage.

In the overlapped portions of the outside surface layer Po, it is preferable that the edges (eb) to be located on the bead side are outside the edges (et) to be located on the tread side as shown in FIG. 7.

The order of winding or forming the outside surface layer Po and the internal windings Q depends on the method of building a green tire.

In case of FIG. 7, a carcass is applied to an expandable drum, and the carcass between the beads is bulged out. In this state, the internal windings Q are wound on the carcass first and then the outside surface layer Po is wound.

However, the order is revered in the following case. The carcass is formed on a drum, and a sidewall rubber is formed on the drum on each side of the carcass. The carcass between the beads is bulged out, and the sidewall rubber is applied to each side of the swelled carcass while turning the sidewall rubber.

Further, it is also possible to make the sidewall rubber GS on a flat or profiled drum and then move it onto the carcass on another drum. In this case, the internal windings Q may be wound firstly.

In the example shown in FIG. 7, one rubber tape 1 is wound from the bead side to the tread side to obtain the above-mentioned overlap structure. The internal windings Q may be formed by various methods as explained in the tread rubber.

THIRD EXAMPLE (Inner Liner)

Figure 8:
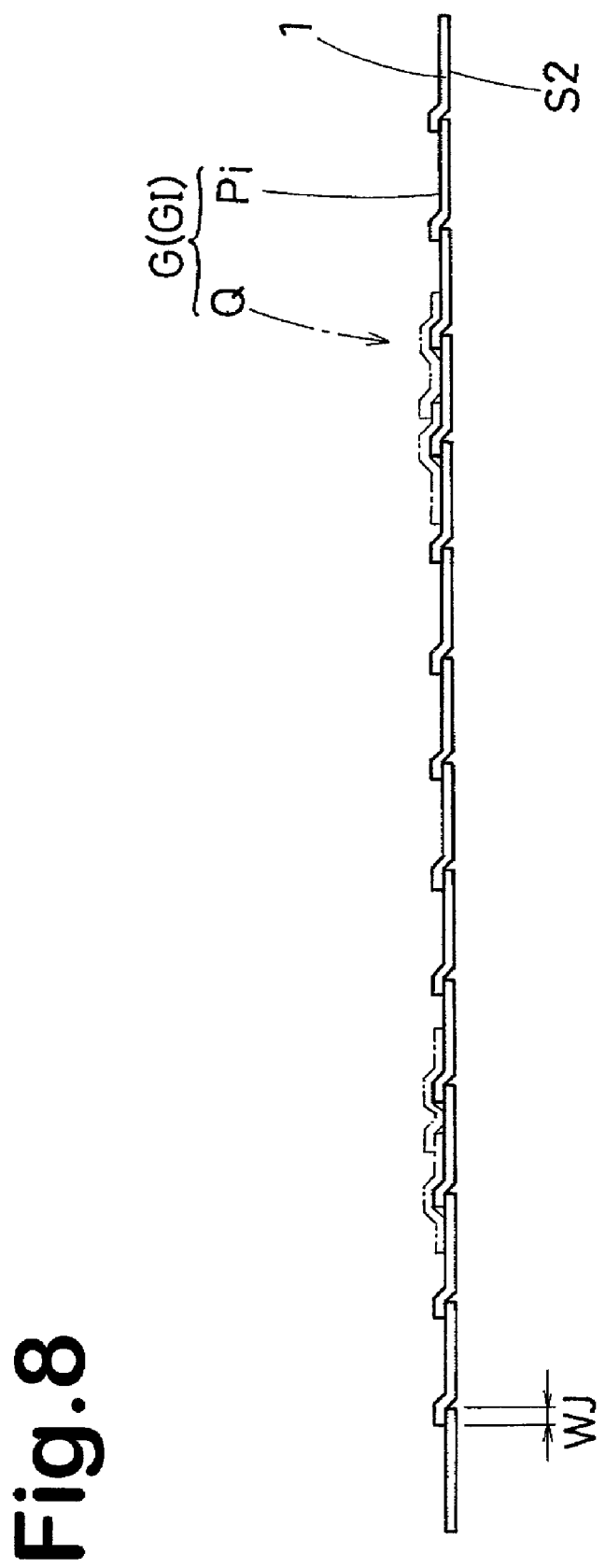
FIG. 8 is a cross sectional view of still another example of the rubber component.
Figure 9:
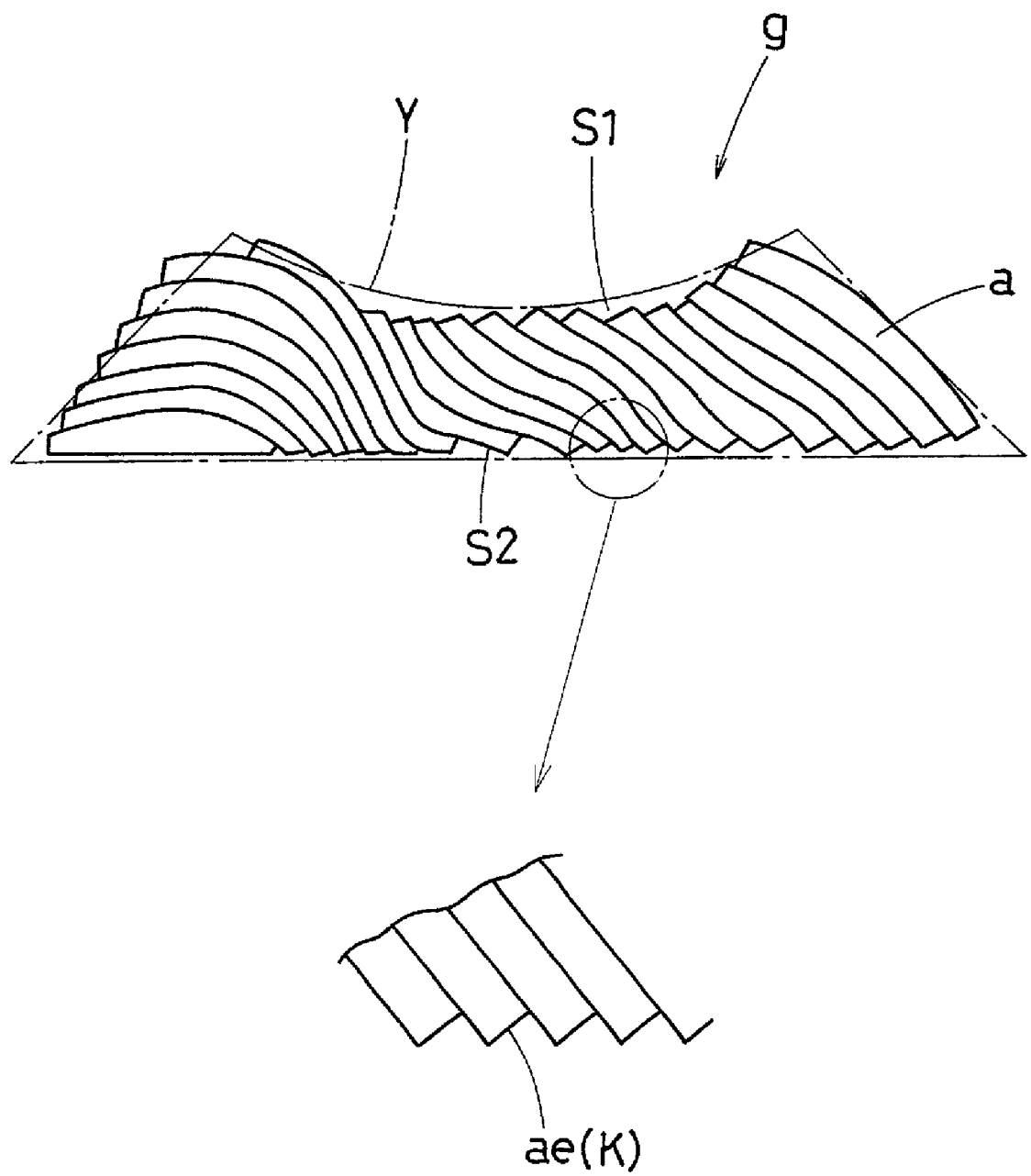
FIG. 9 is a cross sectional view for explaining the prior art.

FIG. 8 shows a third example of the rubber component G which is a raw inner liner rubber GI.

The inner liner rubber GI is very thin when compared with the above two examples. Therefore, the inner liner rubber GI is substantially made up of the surface layer P only. In this example, however, an auxiliary layer R is provided in a region corresponding to the tire shoulder which is subjected to a large bending deformation for the porpoise of reinforcing this region. As the auxiliary layer R is formed on the outside of the surface layer P, this surface layer P may be called as the inside surface layer Pi whose inner face S2 forms the inner face of the tire. To make the inside surface layer Pi, the above-mentioned methods shown in FIGS. 3a–3d may be used.

The auxiliary layer R may be formed by winding the same rubber tape as the inside surface layer Pi.

In the inner liner rubber GI including both the surface layer P and auxiliary layer R, it is preferable that the rubber tape 1 has a thickness Tg of from 0.3 to 2.0 mm, and the overlap width WJ is less than 0.5 times, more preferably less than 0.3 times the tape width Wg but more than 1.0 mm.

As explained above in connection with the three examples GT, GS and GI, the same tape may be used in the surface layer P, auxiliary layer R and the internal windings Q. But it is possible to use different tapes, for example, a wider tape in the surface layer and a thicker tape in the internal windings Q. The method of winding the internal windings Q is not limited to the above-mentioned four examples (FIGS. 4a, 4b and 4c, and description). Various methods may be employed as far as the target sectional shape Y is filled with windings.

For example, a green tire may be manufactured as follows. The inner liner rubber GI is first formed on a tire building drum. A bead rubber is wound on the drum. The carcass is applied to the outside of the inner liner rubber GI. Bead cores are disposed on the carcass. A bead apex rubber is wound on the carcass. The carcass is bulged out. The carcass ply edge portion axially outside the bead core is turned up around the bead core together with the inner liner rubber GI and bead rubber. The tread reinforcing belt is applied to the crown portion of the carcass. The tread rubber is formed thereon. The sidewall rubber is formed on the carcass. The green tire is put in a mold and vulcanized.

Comparison Test

Three kinds of sidewall rubber were made as explained above, changing the overlap width WJ only, and pneumatic tires of size 195/65R15 were experimentally made and visually inspected for defects on the outer surface of the sidewall rubber.

In the following Table 1, the percentage of defective tires is shown by an index based on Ref. 1 being 100. The smaller the index number, the lesser the defective tires.

TABLE 1

| Rubber tape | Ex. 1 | Ex. 2 | Ref. 1 |
|---|---|---|---|
| Width Wg (mm) | 30 | 30 | 30 |
| Thickness Tg (mm) | 0.8 | 0.8 | 0.8 |
| Overlap width WJ | 1.0 mm to 0.25 XWg | 1.0 mm | 0.85 XWg |
| Defective Tire | 91 | 87 | 100 |

As described above, due to the relatively thin rubber tape, the depth of the small dents is decreased, and also the number of small dents is decreased due to the relatively small overlap width decreased in the surface layer. Therefore, defective tires due to damage such as cracks, separation and the like can be decreased and the tire durability can be improved.

The invention claimed is:

1. A method of manufacturing a rubber component for a pneumatic tire comprising
overlap winding at least one rubber tape into a target cross sectional shape for the rubber component, wherein
each rubber tape has a thickness of from 0.3 to 3.0mm and a width of from 5 to 40 mm,
the rubber component comprises an internal portion and a surface layer fully covering the internal portion,
the surface layer made of surface windings of said at least one rubber tape which surface windings are overlapped by a width less than 50% of the rubber tape width but more than 1.0 mm, and
the internal portion made of internal windings of said at least one rubber tape which internal windings are overlapped by a width more than the overlap width of the surface windings.

2. The method according to claim 1, wherein
the rubber component is a tread rubber disposed in a tread portion of the tire.

3. A pneumatic tire comprising at least one rubber component made according to the method as set forth in claim 1.

4. A method of manufacturing a rubber component for a pneumatic tire comprising
overlap winding at least one rubber tape into a target cross sectional shape for the rubber component to form a surface layer made of surface windings of said at least one rubber tape and an internal portion of internal windings of said at least one rubber tape, wherein
each rubber tape has a thickness of from 0.3 to 3.0 mm and width of from 5 to 40 mm,
the surface windings are greater in tape width than the internal windings, and the internal windings are greater in tape thickness than the surface windings, and
the surface windings are overlapped by a width less than 50% of the rubber tape width but more than 1.0 mm and the internal windings are overlapped by a width more than the overlap width of the surface windings.

5. A pneumatic tire comprising at least one rubber component made according to the method as set forth in claim 4.

6. A method of manufacturing a rubber component for a pneumatic tire comprising:
(1) overlap winding on a drum at least one rubber tape to form an inside surface layer, wherein windings of the rubber tape for the inside surface layer overlap by less than 50% of the rubber tape width but more than 1.0 mm;
(2) overlap winding over the inside layer at least one rubber tape to form a cross sectional shape for the rubber component; and
(3) overlap winding over the cross sectional shape at least one rubber tape to form an outside surface layer, wherein windings of the rubber tape for the outside surface layer overlap by less than 50% of the rubber tape width but more than 1.0 mm, and
wherein each rubber tape has a thickness of from 0.3 to 3.0 mm and a width of from 5 to 40 mm, and wherein the inside and outside surface layers fully cover the cross-sectional shape and said at least one rubber tape forming the cross sectional shape is overlapped by a width more than the overlap widths of the surface layers.

7. A method of manufacturing an assembly of a tread reinforcing belt and a rubber component thereon for a pneumatic tire comprising
applying a tread reinforcing belt on a drum,
overlap winding at least one rubber tape on the tread reinforcing belt into a target cross sectional shape for the tread rubber component to form a surface layer made of surface windings of said at least one rubber tape and an internal portion of internal windings of said at least one rubber tape, wherein each rubber tape has a thickness of from 0.3 to 3.0 mm and a width of from 5 to 40 mm, the surface windings are overlapped by a width less than 50% of the rubber tape width but more than 1.0 mm and the internal windings are overlapped by a width more than the overlap width of the surface windings, and the surface layer covers an outer surface of the rubber component exposed to the air and a surface coming into touch with the tread reinforcing belt.

8. A pneumatic tire comprising an assembly of a tread reinforcing belt and a rubber component made according to the method as set forth in claim 7.

* * * * *